United States Patent Office 3,702,828
Patented Nov. 14, 1972

3,702,828
EUROPIUM-ACTIVATED BARIUM AND STRONTIUM, CALCIUM ALUMINUM FLUORIDE PHOSPHORS
Mary V. Hoffman, South Euclid, Ohio, assignor to General Electric Company
No Drawing. Filed Mar. 25, 1971, Ser. No. 128,186
Int. Cl. C09k 1/04
U.S. Cl. 252—301.4 R                    7 Claims

ABSTRACT OF THE DISCLOSURE

Europium-activated calcium aluminum fluoride phosphors of barium and strontium are described which have been found to be efficient producers of sharp line ultraviolet emission resulting from 4f to 4f energy level transitions in the divalent europium, as contrasted to previously known luminescent materials utilizing divalent europium as an activator wherein the emission is due to 5d to 4f energy level transitions. Solid-state and precipitation methods of producing the new phosphors are disclosed. These materials are useful as phosphors in cathode-ray tubes, lamps and other applications.

CROSS-REFERENCE TO A RELATED APPLICATION

A different class of europium-activated alkaline earth aluminum fluoride phosphor type materials is described and claimed in my previously filed copending application entitled Divalent Europium Activated Alkaline Earth Aluminum Fluoride Luminescent Materials and Process, Ser. No. 25,760, filed Apr. 6, 1970 now Pat. No. 3,630,-945 and assigned to the assignee of the present invention. The related luminescent materials have a different chemical composition than materials of the present invention although certain emission characteristics for both type materials are found to be similar.

BACKGROUND OF THE INVENTION

This invention relates to line-emitting luminescent materials which emit in the ultraviolet region of the spectrum. More particularly, the present invention is directed to a new class of crystalline materials which are calcium aluminum fluoride compositions of barium and strontium activated with the divalent europium ion. Divalent europium as an activator in phosphors generally produces broad band emission through the blue and green portions of the visible spectrum. In contrast thereto, phosphors of the present invention emit over a spectral band width of approximately 20 angstroms in the 3600 angstrom region of the spectrum. Sharp line emitters in the near ultraviolet region can be useful for such applications as in photocopying devices and possibly in lasers, and they can also be used for the same purposes as band emitters which radiate in the same region. While some ultraviolet emitting materials are available commercially, such materials have not been found as efficient as desired and ultraviolet line emitters are not generally available.

SUMMARY OF THE INVENTION

A new class of efficient line-emitting luminescent materials has been discovered which emits in the near ultraviolet spectrum. Briefly stated, the present invention provides a class of alkaline earth calcium aluminum fluoride compositions which are activated to luminescence by divalent europium and can be represented by the following structural formula:

$Ba_{1-x-y}Sr_xEu_y{}^{2+}CaAlF_7$ wherein $x$ varies between zero and 1.0 and $y$ varies from a small but effective amount to activate the luminescent material up to 0.40.

An examination into crystalline behavior for these new materials has discovered an inversion from the $\alpha$ crystalline form to a $\beta$-crystalline form at elevated temperatures. The inversion takes place at approximately 715° C. for the compound $BaCaAlF_7$ but rapid reconversion to the $\alpha$-crystalline form occurs upon ordinary cooling. The same behavior is exhibited by compositions of the invention in the range defined by the above-structural formula where $x$ varies between zero and 0.70. In the compositional range having an $x$ value greater than 0.70, however, there is significantly slower reconversion to the $\alpha$-crystalline form upon cooling from the elevated temperatures at which the $\beta$-crystalline inversion takes place. Since the present materials can be prepared by methods which include heating the crystals formed at elevated temperature and which could exceed the inversion temperature for a material in the composition range wherein the $x$ value varies between 0.70 to 1.0, it becomes necessary to limit the firing temperature when a major portion of the $\alpha$-crystalline form is desired. More particularly, it has been discovered that compositions having an $x$ value between 0.70 and 0.90 should not be fired above approximately 700° C. to obtain a major portion of the $\alpha$-crystalline form in the final product upon ordinary cooling. Likewise, the firing temperature of a material wherein the $x$ value is in the range 0.90 to 1.0 which includes the compound $SrCaAlF_7$ should not exceed approximately 480° C. to obtain a preponderance of the $\alpha$-crystalline form with conventional cooling.

The above-described crystalline behavior influences the line emission characteristic for luminescent applications of the material and it is desirable to have a major portion of the luminescent material in the $\alpha$-crystalline form. The desired crystalline form provides $Eu^{2+}$ line emission which as above specified can be governed by the final firing temperature used in preparation which is maintained below the inversion temperature of the crystalline product over a particular composition range. In the composition range where $x$ varies from zero to 0.70, the final firing temperature has not been found critical so that the desired $Eu^{2+}$ ion emission is obtained at all temperatures up to the melting point. In the composition range where $x$ varies between 0.7 and 0.9, a firing temperature below 700° C. provided only negligible amounts of the $\beta$-crystalline form in the final product which did not unfavorably influence the line emission characteristic. Likewise, a firing temperature maintained below 480° C. in the composition range where $x$ varies between 0.9 and 1.0 was found to yield only the $\alpha$-crystalline from in the final product. The desired emission characteristic dictates further limitations upon the concentration of the divalent europium activator in the present compositions. For example, when $x=1$ so that the compound $SrCaAlF_7$ is formed, then only approximately 0.15 mole of europium ion per mole of said compound can be utilized without risk of forming some other product which does not exhibit the line emission characteristic. On the other hand, when $x=0$ so that the compound $BaCaAlF_7$ is formed, then greater molar concentrations of the $Eu^{2+}$ ion can be incorporated up to 0.40 due to ability of the crystalline lattice for said compound to accommodate more activator ion.

Unless otherwise specified percentages and proportions recited herein are given in molar quantities.

DESCRIPTION OF THE PREFERRED EMBODIMENTS

The luminescent materials of the present invention are all selected from the ternary system $MF_2$—$MF_2$—$AlF_3$ where M is an alkaline earth metal selected from Ca, Sr or Ba. The only compounds existing in said ternary system are $BaCaAlF_7$ and $SrCaAlF_7$ so that when luminescent materials within the compositional series defined by the aforementioned generic formula contain more than a single alkaline earth metal there can be a solid solution having a crystalline structure common to the above-specified compounds. Thus, while materials of the invention can have minor differences in crystalline structure dictated by the particular chemical composition, all chemical compositions of the present invention possess a crystalline structure which exhibits an emission wherein the 4f—4f transitions predominate as compared with the 5d to 4f band transitions attributable to the divalent europium ion activator.

Resolved emission spectra for luminescent materials of the present invention show several individual lines in the 3580–3600 angstrom region of the spectrum when measured at room temperature employing a resolution of 0.5 angstrom spectral band width. The base portion of said emission spectra also consists of minor emission from 5d to 4f band transitions which is less than exhibited by the luminescent materials disclosed in the aforementioned copending patent application. By reason of such generally similar behavior, however, it becomes necessary only to point out the general mechanism for the line emission obtained. Accordingly, in the phosphors $BaCaAlF_7$ and $SrCaAlF_7$ the 4f to 4f lines contribute most of the emission and little or none can be detected from 5d to 4f band transitions. The type of spectra obtained from the phosphors $MCaAlF_7$ where M is a mixture of Sr+Ba can be characterized as changing the energy level transitions to introduce more emission from the 5d to 4f levels and further altering the wavelength of the emission. Changes in emission with slight changes in composition illustrate the sensitivity of the 4f—4f transitions of $Eu^{2+}$ to the structural position in which the $Eu^{2+}$ is formed. Generally, these phosphors absorb exciting energy at least to some extent in the 5d band and then, if the 5d band is enough above the energy levels of the 4f band, the energy is transmitted to the 4f band. Transitions within the 4f band apparently produce the line emission which is characteristic of the materials of the present invention.

The intensity of the line emission behavior for luminescent materials of the present invention as will be remembered depends both upon composition as well as the firing temperature at which the final product is prepared. The minimum concentration level for the $Eu^{2+}$ ion activator to obtain commercially acceptable emission intensity is at a $y$ value of 0.005. The $y$ value can range from 0.15 at an $x$ value of 1.0 in the above-specified generic formula which defines the compound $SrCaAlF_7$ to a maximum $y$ value up to 0.40 when $x=0$ for the compound $BaCaAlF_7$. For maximum line emission intensity the $x$ value can range from zero to 0.03 with a $y$ value range from 0.01 to 0.10. Brightness decreases to about 50% or less when Sr is substituted for Ba in the compositional series from a value of $x=0.10$ to $x=1.0$. The $BaCaAlF_7$ compound of the present invention exhibits a peak intensity almost twice that exhibited by the $BaAlF_5$ compound disclosed in the aforementioned copending application. A further observed decrease in relative base emission makes the $BaCaAlF_7$ compound a more preferred material for laser applications.

The luminescent materials of the present invention can be prepared by a number of processes but which all terminate with the firing temperature limitations above set forth. The examples given hereafter illustrate various methods of preparation for the luminescent materials all having an $Eu^{2+}$ activator ion level of 0.02 mole which corresponds to $y=0.02$ in the above generic formula. A first method mixes all the starting materials as solid fluorides and fires the mixture at a temperature which yields the phosphor composition whereupon said phosphor composition is fired or held at a second temperature to produce a recrystallized luminescent material having the desired α-crystalline form. A different preparation method coprecipitates the constituents of the phosphor composition as fluorides and then proceeds with the firing steps indicated in the first preparation method. A third method of preparing the luminescent material combines either of the phosphor compounds $BaAlF_5$ and $SrAlF_5$ with the $Eu^{2+}$ activator ion and $CaF_2$ followed by firing said mixture in the same manner heretofore specified. The examples provided below furnish details of preparation for each of the above-summarized processes and are calculated to provide 0.10 mole of the final composition.

EXAMPLE 1

|  | $BaCaAlF_7$ | | $SrCaAlF_7$ | | $Ba_{0.5}Sr_{0.5}CaAlF_7$ | |
| --- | --- | --- | --- | --- | --- | --- |
|  | Grams | Moles | Grams | Moles | Grams | Moles |
| $BaF_2$ | 17.18 | 0.098 |  |  | 8.59 | 0.049 |
| $SrF_2$ |  |  | 12.31 | 0.098 | 6.16 | 0.049 |
| $CaF_2$ | 7.81 | 0.100 | 7.81 | 0.100 | 7.81 | 0.100 |
| $EuF_3$ | 0.418 | 0.002 | 0.418 | 0.002 | 0.418 | 0.002 |
| $AlF_3$ | 8.39 | 0.100 | 8.39 | 0.100 | 8.39 | 0.100 |

$BaF_2$, $CaF_2$ and $SrF_2$ are available commercially. $AlF_3$ is prepared by firing $Al_2O_3$ in anhydrous HF at temperatures in the range of 700–800° C. for several hours. $EuF_3$ is prepared from $Eu_2O_3$ by similar firing in the temperature range of 900–1000° C. A preferred source of $EuF_3$, $CaF_2$, $BaF_2$ and $SrF_2$ can be first prepared as a coprecipitated carbonate or oxalate, combining Eu with Sr or Ba in the proportions required. This carbonate or oxalate is fired in air to the oxide then refired in anhydrous HF at 800–900° C. to produce a mixture of the $BaF_2$ or $SrF_2$ with the $EuF_3$. The alkaline earth europium fluoride is then mixed with the aluminum fluoride and calcium fluoride, either dry or in acetone. The mixed materials are then first fired in a gas consisting of nitrogen with about 1% hydrogen at about 800° C. for several hours such as 4 hours to form the desired compound and to incorporate europium in the divalent state. The divalent alkaline earth metals in these compounds facilitate the incorporation of the europium in the divalent state, and the trivalent aluminum minimizes the likelihood of the europium being present in the trivalent state. The material is then reheated in an anhydrous hydrogen fluoride atmosphere which can employ a nitrogen carrier gas at temperatures 700–800° C. for 2 hours and finally held at the required temperature to produce the α-crystalline form of the particular product being prepared. The final firing step can also be carried out in a different inert gas or other non-oxidizing atmosphere for greater ease of operation. More particularly, the compound $BaCaAlF_7$ and the solid solution $Ba_{0.5}SR_{0.5}CaAlF_7$ shown in this example are refired or held in the temperature range 700–800° C. for several hours in a nitrogen atmosphere while the compound $SrCaAlF_7$ is refired or held in the temperature range 400–480° C. in the same atmosphere to provide the final crystalline product. All three products exhibit the desired line emission characteristic.

EXAMPLE 2

|  | $BaCaAlF_7$, grams | $SrCaAlF_7$, grams |
| --- | --- | --- |
| $Ba(NO_3)_2$ | 22.43 |  |
| $Sr(NO_3)_2$ |  | 20.74 |
| $Ca(NO_3)_2 \cdot 4H_2O$ | 23.6 | 23.6 |
| $Al(NO_3)_3 \cdot 9H_2O$ | 37.5 | 37.5 |
| $Eu_2O_3$ | 0.35 | 0.35 |
| $NH_4F \cdot HF$ | 20.0 | 20.0 |

All above-listed starting materials are commercially available. The $Eu_2O_3$ is dissolved in dilute $HNO_3$. All the other ingredients are dissolved in about 400 milliliters (ml.) $H_2O$ for each material, and the alkaline earth metals, Al and Eu nitrate solutions are then combined by pouring them together. The solution is heated to 70–90° C. and the pH is adjusted to between 6 and 7 by adding $NH_4OH$ as required. The fluoride solution is then added to the nitrate solution, forming a precipitate. This is heated for a sufficient time to digest the precipitate and produce larger crystals that can be filtered more effectively. For 20 minutes to several hours at 70–90° C. is effective for digesting, depending on the particle size sought. The mixture is then filtered, washed with water and dried. The same firing procedure described in the preceding example for the compounds BaCaAlF₇ and SrCaAlF₇ is employed to prepare the final crystalline product. Both products exthe line emission characteristic previously described for the compositions of the present invention.

EXAMPLE 3

|  | BaCaAlF₇, grams | SrCaAlF₇, grams |
|---|---|---|
| Ba₀.₉₈Eu₀.₀₂AlF₅ | 25.9 |  |
| CaF₂ | 7.81 | 7.91 |
| Sr₀.₉₈Eu₀.₀₂AlF₅ |  | 20.9 |

The Ba₀.₉₈Eu₀.₀₂AlF₅ and Sr₀.₉₈Eu₀.₀₂AlF₅ starting materials employed in this example are prepared by the precipitation method described in preceding Example 2. Specifically, precipitates of BaAlF₅ and SrAlF₅ including the activator are prepared using the same starting materials and quantities recited in Example 2 except for exclusion of the Ca(NO₃)₂·4H₂O constituent. The dried precipitates are mixed with CaF₂ and said mixtures are then fired under the same conditions employed in preceding examples. This method has the advantage of incorporating the Eu²⁺ activator ion in either a matrix of BaAlF₅ or SrAlF₅ crystals which are easier to prepare by precipitation than compositions containing the calcium ion.

It will be apparent from the foregoing description that a new class of luminescent materials has been provided which are useful as phosphors in other applications. It should also be appreciated from the foregoing description that luminescent materials of the present invention can be prepared from different starting materials than herein disclosed so that it is intended to limit the present invention, therefore, only to the scope of the following claims.

What I claim as new and desire to secure by Letters Patent of the United States is:

1. A luminescent material having the following structural formula:

$$Ba_{1-x-y}Sr_xEu_y^{2+}CaAlF_7$$

wherein $x$ varies between zero and 1.0 and $y$ varies from a small but effective amount to activate the luminescent material up to 0.40.

2. A luminescent material according to claim 1 wherein $x$ varies between zero and 0.3 and $y$ varies from a small but effective amount to activate the phosphor up to 0.10.

3. A luminescent material according to claim 1 having essentially the formula:

$$Ba_{1-y}Eu_y^{2+}CaAlF_7$$

wherein $y$ varies from a small but effective amount to activate the phosphor up to 0.40.

4. A luminescent material according to claim 1 having essentially the formula:

$$Sr_{1-y}Eu_y^{2+}CaAlF_7$$

wherein $y$ varies from a small but effective amount to activate the phosphor up to 0.15.

5. A luminescent material according to claim 1 having the formula:

$$Ba_{1-x-y}Sr_xEu_y^{2+}CaAlF_7$$

wherein $x$ varies from zero to 0.70 and $y$ varies from a small but effective amount to activate the phosphor up to 0.40, and with at least a major portion of said phosphor having the α-crystalline form.

6. A luminescent material as in claim 5 wherein $x$ varies between 0.7 and 0.9.

7. A luminescent material as in claim 5 wherein $x$ varies between 0.9 and 1.0.

References Cited
UNITED STATES PATENTS 3,507,802  4/1970  Amster _____ 252—301.4 R
3,630,945  12/1971  Hoffman _____ 252—301.4 R ROBERT D. EDMONDS, Primary Examiner